H. A. KEITEL.
FUEL VAPORIZING MEANS FOR VEHICLE MOTORS.
APPLICATION FILED FEB. 21, 1918.
1,301,707. Patented Apr. 22, 1919.
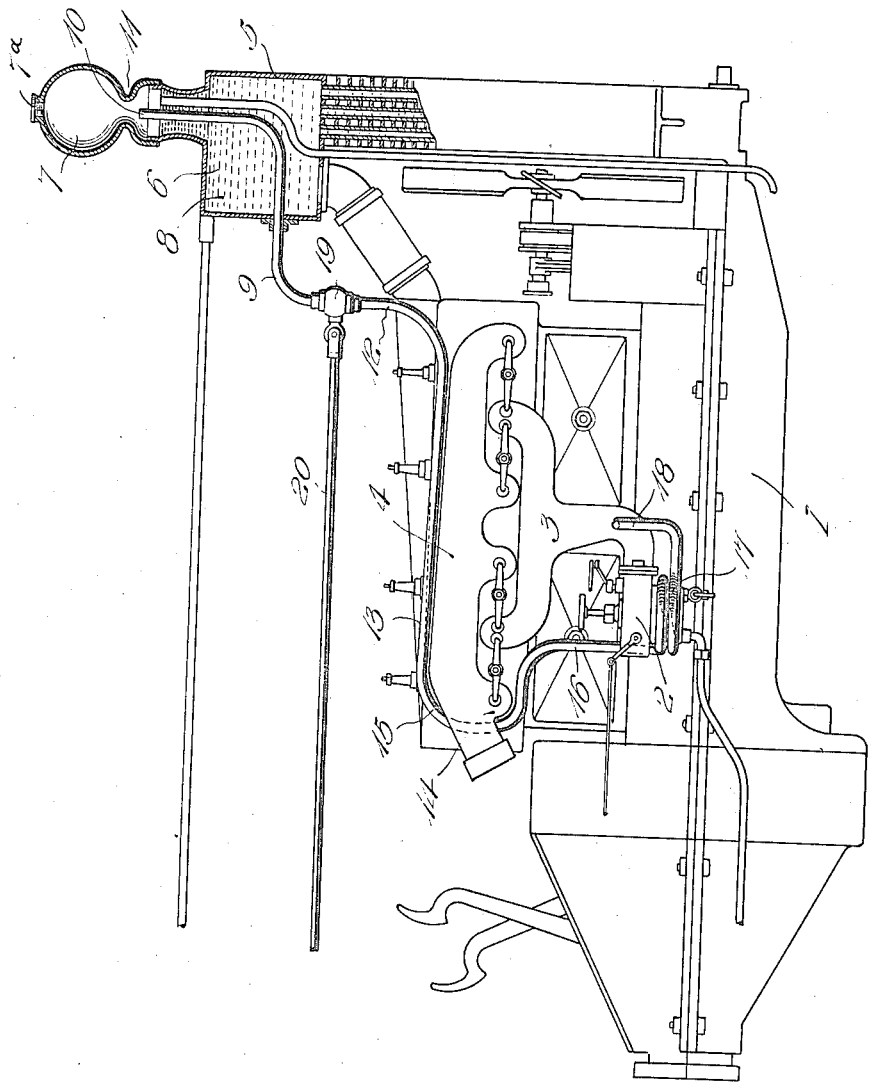
Witness
C. Chambers
Inventor
Henry A. Keitel
By H. B. Willson & Co.
Attorneys

UNITED STATES PATENT OFFICE.

HENRY A. KEITEL, OF ST. LOUIS, MISSOURI.

FUEL-VAPORIZING MEANS FOR VEHICLE-MOTORS.

1,301,707.

Specification of Letters Patent. Patented Apr. 22, 1919.

Application filed February 21, 1918. Serial No. 218,542.

*To all whom it may concern:*

Be it known that I, HENRY A. KEITEL, a citizen of the United States, residing at St. Louis and State of Missouri, have invented certain new and useful Improvements in Fuel-Vaporizing Means for Vehicle-Motors; and I do declare the following to be a full, clear, and exact description of the invention, such as will enable others skilled in the art to which it appertains to make and use the same.

My invention has for its object to provide simple and inexpensive means for heating the carbureters of internal combustion engines and at the same time supplying steam to the intake manifolds thereof, to reduce fuel consumption and also to assist in keeping the engine cylinders free of carbon, and with this object in view the invention resides in the arrangement herein described and claimed, and shown in the accompanying drawing wherein a side elevation of an automobile engine with its radiator partly in section, is shown.

In the drawing above briefly described, the numeral 1 designates a common type of internal combustion engine, 2 has reference to the carbureter, 3 designates the intake manifold, 4 indicates the exhaust manifold, and 5 the radiator having the usual filling neck 6 provided in the present instance with an enlarged dome shaped cap 7 having a small air inlet 7ª in its upper end. This cap serves as a steam dome to collect the steam rising from the water in the radiator.

Passing through the rear side of the upper radiator header 8, is a tube 9 of copper or other suitable material, said tube rising above the water level in the radiator and having its upper end 10 located in close proximity to the restricted portion 11 of the cap 7. From the radiator, the tube 9 extends rearwardly and downwardly at 12 to the exhaust manifold 4, rearwardly along the latter at 13, inwardly around the rear branch 14 of said manifold as seen at 15, then forwardly and downwardly at 16, around the bowl of the carbureter 2 in the form of a coil 17, and finally discharges at 18 into the intake manifold 3. A valve 19 is located in the vertical portion 12 of the tube 9 and an operating rod 20 extends horizontally from said valve through the dash of the machine for so controlling it as to accurately regulate the amount of steam and air passing into the intake manifold through the tube, it being understood that each intake stroke of the engine pistons will draw the accumulated steam from the dome 7 through the tube in question into the intake manifold, also drawing air through the inlet 7ª and through said tube. In this manifold, the steam and air mix with the fuel from the carbureter and form a highly combustible mixture which insures perfect firing in the engine cylinders, increases power and practically eliminates the formation of carbon.

It is to be observed that the steam and air in passing through the tube 9, is super-heated by the portion of said tube which extends along the exhaust manifold 4, and that this super-heated mixture by passage through the coil 17, will so heat the carbureter as to raise the temperature of the fuel to such a degree as to render it more volatile, thus insuring much better results than are obtained from cold fuel drawn directly into the engine cylinders.

From the foregoing, taken in connection with the accompanying drawing, it will be obvious that although my invention is of extremely simple and inexpensive nature, it will be highly efficient for the purposes intended and that the quantity of steam fed to the intake manifold may be readily controlled according to atmospheric conditions. Since probably the best results are obtained from the several details shown and described, these details are by preference employed, but within the scope of the invention as claimed, numerous minor changes may well be made.

I claim:

The combination with the internal combustion engine of a motor vehicle, its carbureter, intake and exhaust manifolds, and radiator; of a tube passing into said radiator and rising therein to a point above the water level, said tube leading vertically downward from said radiator to said exhaust manifold and extending rearwardly along the upper side of said manifold substantially throughout the length of the latter, and then downwardly behind the rearmost branch of said exhaust manifold, said tube then extending forwardly and downwardly to the carbureter, being coiled around the fuel bowl of said carbureter, and finally discharging into said intake manifold, a valve in said first named downwardly extending portion of said tube, and a control rod for said valve leading rearwardly in a horizontal direction to operate said valve from the dash of the machine.

In testimony whereof I have hereunto set my hand in the presence of two subscribing witnesses.

HENRY A. KEITEL.

Witnesses:
R. F. STANTON,
JOHN KEITEL.